(12) United States Patent
Wu (10) Patent No.: US 12,344,299 B1
(45) Date of Patent: Jul. 1, 2025

(54) SIMPLE FOLDING CART

(71) Applicant: Wuyi Migo Leisure Products Co., Ltd., Jinhua (CN)

(72) Inventor: Peiwu Wu, Wuhu (CN)

(73) Assignee: Wuyi Migo Leisure Products Co., Ltd., Jinhua (CN)

( * ) Notice: Subject to any disclaimer, the term of this patent is extended or adjusted under 35 U.S.C. 154(b) by 0 days.

(21) Appl. No.: 19/002,406

(22) Filed: Dec. 26, 2024

(30) Foreign Application Priority Data

Nov. 29, 2024 (CN) .......................... 202422938508.8

(51) Int. Cl.
  *B62B 3/02* (2006.01)
  *B62B 5/06* (2006.01)
(52) U.S. Cl.
  CPC ............... *B62B 3/02* (2013.01); *B62B 5/067* (2013.01); *B62B 2301/05* (2013.01)
(58) Field of Classification Search
  None
  See application file for complete search history.

(56) References Cited

U.S. PATENT DOCUMENTS

| | | | |
|---|---|---|---|
| 10,968,038 B2* | 4/2021 | Hopkins | B65F 1/141 |
| 11,247,708 B2* | 2/2022 | Wang | B62B 3/025 |
| 11,465,664 B1* | 10/2022 | Choi | B62B 3/025 |
| 11,745,777 B2* | 9/2023 | Yang | B62B 3/02 |
| | | | 280/39 |
| 12,128,940 B2* | 10/2024 | Sun | B62B 3/007 |
| 2003/0025301 A1* | 2/2003 | Banuelos, III | B62B 3/022 |
| | | | 280/47.38 |
| 2021/0086812 A1* | 3/2021 | Park | B62B 3/02 |
| 2023/0219608 A1* | 7/2023 | Jiang | B62B 3/025 |
| | | | 280/651 |
| 2024/0166253 A1* | 5/2024 | Feng | B62B 3/02 |
| 2024/0336290 A1* | 10/2024 | Sun | B62B 3/007 |

FOREIGN PATENT DOCUMENTS

| | | | |
|---|---|---|---|
| CN | 211912010 U | | 11/2020 |
| CN | 220009861 U | | 11/2023 |
| CN | 221251266 U | * | 7/2024 |
| CN | 221273064 U | * | 7/2024 |
| DE | 202019105298 U1 | * | 11/2019 |

OTHER PUBLICATIONS

Translation of CN 221273064 (Year: 2024).*

* cited by examiner

*Primary Examiner* — Katy M Ebner
(74) *Attorney, Agent, or Firm* — Nitin Kaushik (57) ABSTRACT

The present invention discloses a simple folding cart, including a cart frame body and a cloth cover sleeved on the cart frame body. The cart frame body includes a side frame and a folding frame, and the folding frame includes an upper folding rod and a lower folding rod. The upper folding rod is hinged to first and second rotating bodies through first and second upper connecting shafts, and the lower folding rod is hinged to the first and second rotating bodies through first and second lower connecting shafts. The underframe can be limited on a lower side of the first rotating body through the upper folding rod and can be limited on an upper side of the second rotating body through the lower folding rod so as to be maintained in an unfolded state and support the two side frames to be maintained in an unfolded state.

6 Claims, 7 Drawing Sheets

SIMPLE FOLDING CART

CROSS-REFERENCE TO RELATED APPLICATIONS

The application claims priority to Chinese patent application No. 2024229385088, filed on Nov. 29, 2024, the entire contents of which are incorporated herein by reference.

TECHNICAL FIELD

The present invention relates to the field of carts, and in particular, to a simple folding cart.

BACKGROUND

The existing folding cart, such as a utility model patent with the publication number of CN218616753U entitled "a folding cart", includes four supporting rods, wheel bodies, and a bottom support. The folding units are linearly arranged and are movably connected in sequence through first hinge seats; a side support located between the two adjacent supporting rods; the two corresponding shear fork rods between the two shear fork rod sets arranged at intervals on the side support which is folded or unfolded in the length direction of the folding cart extend downwards, converge and are hinged to the second hinge seat, and when the folding cart is in an unfolded state, the second hinge seat abuts against the bottom surface of the first hinge seat, and the first hinge seat and the second hinge seat relatively vertically slide in the unfolding or folding process of the folding cart through a limiting rod. Due to the existence of the side shear fork support, this folding cart is relatively heavy, the size after being folded is relatively large, which is inconvenient for packaging, carrying, or transportation.

SUMMARY

In view of deficiencies in the prior art, the present invention provides a simple folding cart. The design of a side shear fork support is eliminated, and the side frame can be supported through the underframe, so that the overall weight of the folding cart and the size after being folded are greatly reduced, and packaging, carrying or transportation are facilitated.

The present invention provides a simple folding cart, including a cart frame body and a cloth cover sleeved on the cart frame body, where the cart frame body includes an underframe and two side frames respectively arranged on two sides of the underframe in a length direction, the underframe includes two folding frames, one ends of the two folding frames are mutually hinged through a first rotating structure, and the other ends of the two folding frames are respectively hinged to the side frames correspondingly arranged through a second rotating structure; the folding frame includes an upper folding rod arranged in a length direction of the underframe and a lower folding rod arranged on a lower side of the upper folding rod; the first rotating structure includes a first rotating body, two first upper connecting shafts arranged at intervals and two first lower connecting shafts arranged at intervals, and two first lower connecting shafts are arranged below the two first upper connecting shafts in a staggered manner; and the second rotating structure includes a second rotating body, a second upper connecting shaft, and a second lower connecting shaft arranged below one side, close to the first rotating structure, of the second upper connecting shaft in a staggered manner; and one end of the upper folding rod is hinged to the first rotating body through the first upper connecting shaft, and the other end of the upper folding rod is hinged to the second rotating body through the second upper connecting shaft; and one end of the lower folding rod is hinged to the first rotating body through the first lower connecting shaft, and the other end of the lower folding rod is hinged to the second rotating body through the second lower connecting shaft, and the underframe can be limited on a lower side of the first rotating body through the upper folding rod and/or can be limited on an upper side of the second rotating body through the lower folding rod so as to be maintained in an unfolded state and support the two side frames to be maintained in an unfolded state.

Preferably, the first rotating body includes two first rotating side plates arranged opposite to each other and a first connecting plate connected between the two first rotating side plates, a first rotating groove is formed between a lower side of the first connecting plate and the two first rotating side plates in a surrounding manner, one end of the upper folding rod is arranged in the first rotating groove and is hinged to the first rotating side plate through the first upper connecting shaft, one end of the lower folding rod is arranged in the first rotating groove and is hinged to the first rotating side plate through the first lower connecting shaft, and when the underframe is in an unfolded state, the first connecting plate abuts against an upper side surface of the upper folding rod.

Preferably, the first connecting plate includes a first plate body arranged in a horizontal direction and a first limiting portion extending downwards from the first plate body, the first limiting portion is provided with a first limiting bottom surface and a first limiting side surface facing the first rotating groove, when the underframe is in an unfolded state, the upper folding rod abuts against the first limiting bottom surface, and when the underframe is in a folded state, the upper folding rod can abut against the first limiting side surface.

Preferably, the first rotating body further includes a partition plate connected between the two first rotating side plates, the first connecting plate is disposed along the top of the two first rotating side plates, the partition plate is arranged on the lower side of the first connecting plate in a vertical direction, the two sides of the partition plate are respectively provided with the first rotating grooves arranged corresponding to the upper folding rod and the lower folding rod of the two folding frames, the first rotating body is provided with first rotating openings extending from two sides of the partition plate to the lower side of the first connecting plate respectively, each first rotating opening is in communication with each first rotating groove and is used for allowing an end portion of the upper folding rod and an end portion the lower folding rod to rotate inside.

Preferably, a first upper connecting channel for rotatably mounting the first upper connecting shaft is disposed on the upper folding rod in a penetrating manner, first upper connecting holes for rotatably mounting the first upper connecting shaft are respectively disposed on the two first rotating side plates in a penetrating manner, and the upper folding rod is rotatably connected to the first rotating body in a matching manner in the first upper connecting channel and the first upper connecting hole through the first upper connecting shaft; and a first lower connecting channel for rotatably mounting the first lower connecting shaft is disposed on the lower folding rod in a penetrating manner, first lower connecting holes for rotatably mounting the first lower connecting shaft are respectively disposed on the two first rotating side plates in a penetrating manner, and the lower folding rod is rotatably connected to the first rotating body in a matching manner in the first lower connecting channel and the first lower connecting hole through the first lower connecting shaft.

Preferably, the two first upper connecting shafts and the two first lower connecting shafts of the first rotating structure are arranged in an isosceles trapezoid structure, the two first upper connecting shafts are arranged along two ends of an upper bottom of the isosceles trapezoid structure, the two first lower connecting shafts are arranged along two ends of a lower bottom of the isosceles trapezoid structure, and a distance between the two first lower connecting shafts is smaller than a distance between the two first upper connecting shafts.

Preferably, the lower folding rod is stacked on the lower side of the upper folding rod, and an upper side surface of the lower folding rod is in contact with a lower side surface of the upper folding rod.

Preferably, the second rotating body includes two second rotating side plates arranged opposite to each other and a second connecting plate connected between the two second rotating side plates, a second rotating groove is formed between an upper side of the second connecting plate and the two second rotating side plates in a surrounding manner, the other end of the upper folding rod is arranged in the second rotating groove and is hinged to the second rotating side plate through the second upper connecting shaft, the other end of the lower folding rod is arranged in the second rotating groove and is hinged to the second rotating side plate through the second lower connecting shaft, and when the underframe is in an unfolded state, the second connecting plate abuts against a lower side surface of the lower folding rod.

Preferably, the second connecting plate is arranged in a horizontal direction, the second connecting plate is provided with an opening structure for allowing the end portion of the lower folding rod to rotate inside, a second limiting portion is formed on the second connecting plate on one side of the opening structure away from the side frame, the second limiting portion is provided with a second limiting top surface and a second limiting side surface facing the opening structure, when the underframe is in an unfolded state, the lower folding rod abuts against the second limiting top surface, and when the underframe is in a folded state, the lower folding rod can abut against the second limiting side surface.

Preferably, the side frame includes two vertical rods arranged opposite to each other, a first horizontal rod connected between upper portions of the two vertical rods, and a second horizontal rod connected between lower portions of the two vertical rods, and the second rotating body is fixedly disposed on the second horizontal rod or arranged at the lower portion of the vertical rod; an open structure without a connecting frame is arranged between two side portions of the two side frames; the cart further includes at least four wheel body assemblies, each wheel body assembly includes a rolling wheel member and a rolling wheel support used for mounting the rolling wheel member, and the rolling wheel support of each wheel body assembly is detachably connected to a lower end of each vertical rod through a quick release structure; and the cart further includes at least one pull rod structure rotatably connected to the second horizontal rod, and the pull rod structure includes a lower pull rod, an upper pull rod telescopically connected to the lower pull rod, and a pull rod handle connected to an upper end of the upper pull rod.

The present invention provides a simple folding cart, including a cart frame body and a cloth cover sleeved on the cart frame body. Since the underframe of the cart frame body includes an upper folding rod arranged in a length direction of the underframe and a lower folding rod arranged on a lower side of the upper folding rod, and one end of the upper folding rod is hinged to the first rotating body through the first upper connecting shaft, and the other end of the upper folding rod is hinged to the second rotating body through the second upper connecting shaft, one end of the lower folding rod is hinged to the first rotating body through the first lower connecting shaft, and the other end of the lower folding rod is hinged to the second rotating body through the second lower connecting shaft, and when the underframe is in an unfolded state, the underframe can be limited on a lower side of the first rotating body through the upper folding rod and/or can be limited on an upper side of the second rotating body through the lower folding rod, so that the underframe is maintained in the unfolded state, and the upper folding rod and the lower folding rod on the two sides of the first rotating body are hinged to the corresponding side frames to support the two side frames to be maintained in an unfolded state, so that the simple folding cart can support the side frame through the underframe, and the design of a side shear fork support in the prior art is eliminated, so that the overall weight of the folding cart and the size after being folded are greatly reduced, and packaging, carrying or transportation are facilitated. Meanwhile, the structural design of the double-folding rod further enhances the structural stability of the underframe, sufficient support can be provided when the underframe is subjected to a force, and the loading capacity is relatively high; and the two first lower connecting shafts are arranged below the two first upper connecting shafts in a staggered manner, so that the upper folding rod and the lower folding rod can rotate from a horizontal state to a vertical state at the same time and do not interfere with each other, thereby guaranteeing the folding function of the folding cart, and increasing the practicability.

Additional aspects and advantages of the present invention will be partially presented in the following description, some of which will become apparent from the following description, or learned through practice of the present invention.

BRIEF DESCRIPTION OF THE DRAWINGS

The accompanying drawings illustrated herein are used to provide a further understanding of the present invention, and form part of the specification, and are used together with embodiments of the present invention to explain the present invention, and do not constitute a limitation on the present invention. In the drawings.

DETAILED DESCRIPTION OF THE EMBODIMENTS

In order to make the objectives, technical solutions and advantages of the embodiments of the present invention clearer, the technical solutions in the embodiments of the present invention are clearly and completely described below with reference to the drawings in the embodiments of the present invention. Apparently, the described embodiments are part, rather than all of the embodiments of the present invention. All other embodiments obtained by those of ordinary skill in the art based on the embodiments described in the present invention without creative efforts shall fall within the protection scope of the present invention.

In the description of the present invention, it should be understood that orientations or position relationships indicated by terms "upper", "lower", "front", "rear", "left", "right", "top", "bottom", "inside", "outside", etc. are orientation or position relationships as shown in the drawings, and these terms are just used to facilitate description of the present invention and simplify the description, but not to indicate or imply that the mentioned device or elements must have a specific orientation and must be established and operated in a specific orientation, and thus, these terms cannot be understood as a limitation to the present invention.

In the present invention, unless otherwise clearly specified, the terms "provided", "connected with", "connected to", and "fixed" should be understood in a broad sense. For example, the connection may be a fixed connection, a detachable connection or an integrated connection, may be a mechanical connection or an electrical connection, may be a direct connection or an indirect connection with use of an intermediate medium, or may be intercommunication between two components. A person of ordinary skill in the art can understand specific meanings of the terms in the present invention according to specific situations.

In the present invention, unless otherwise expressly specified and defined, a first feature being "above" or "below" a second feature may include not only direct contact between the first and second, features but also indirect contact between the first and second features via another feature between them. Furthermore, a first feature being "above" a second feature includes the first feature being directly above and diagonally above the second feature, or simply means that the first feature is higher in level than the second feature. Furthermore, a first feature being "below" a second feature includes the first feature being directly below and diagonally below the second feature, or simply means that the first feature is lower in level than the second feature.

Unless otherwise defined, the technical or scientific terms used in the present invention shall have the common meanings as understood by those skilled in the art to which the present invention belongs. The terms "first", "second", and the like used in the specification and the claims of the present invention are not intended to indicate any sequence, amount or importance, but distinguish different components. Also, the terms such as "a", "an", and the like are not intended to limit the amount, but indicate the existence of at least one.

As shown in FIG. 1 to FIG. 7, as an embodiment of the present invention, a simple folding cart is provided, including a cart frame body 1 and a cloth cover (not shown in the figure) sleeved on the cart frame body 1, where the cart frame body 1 includes an underframe 2 and two side frames 3 respectively arranged on two sides of the underframe 2 in a length direction, the underframe 2 includes two folding frames 21, one ends of the two folding frames 21 are mutually hinged through a first rotating structure 4, and the other ends of the two folding frames are respectively hinged to the side frames 3 correspondingly arranged through a second rotating structure 5. The folding frame 21 includes an upper folding rod 22 arranged in a length direction of the underframe 2 and a lower folding rod 23 arranged on a lower side of the upper folding rod 22; the first rotating structure 4 includes a first rotating body 41, two first upper connecting shafts 42 arranged at intervals and two first lower connecting shafts 43 arranged at intervals, and two first lower connecting shafts 43 are arranged below the two first upper connecting shafts 42 in a staggered manner; and the second rotating structure 5 includes a second rotating body 51, a second upper connecting shaft 52, and a second lower connecting shaft 53 arranged below one side, close to the first rotating structure 4, of the second upper connecting shaft 52 in a staggered manner. One end of the upper folding rod 22 is hinged to the first rotating body 41 through the first upper connecting shaft 42, and the other end of the upper folding rod is hinged to the second rotating body 51 through the second upper connecting shaft 52; and one end of the lower folding rod 23 is hinged to the first rotating body 41 through the first lower connecting shaft 43, and the other end of the lower folding rod is hinged to the second rotating body 51 through the second lower connecting shaft 53. According to the simple folding cart of this embodiment, when the underframe is in an unfolded state, the underframe can be limited on a lower side of the first rotating body 41 through the upper folding rod 22 and can be limited on an upper side of the second rotating body 42 through the lower folding rod 23, so that the underframe 2 is maintained in the unfolded state, and the upper folding rod 22 and the lower folding rod 23 on the two sides of the first rotating body 41 are hinged to the corresponding side frames 3 to support the two side frames 3 to be maintained in an unfolded state, so that the simple folding cart of this embodiment can support the side frame 3 through the underframe 2, and the design of a side shear fork support in the prior art is eliminated, so that the overall weight of the folding cart and the size after being folded are greatly reduced, and packaging, carrying or transportation are facilitated. Meanwhile, the structural design of the double-folding rod further enhances the structural stability of the underframe 2, enough support can be provided when the underframe 2 is subjected to a force, and the loading capacity is relatively high; and the two first lower connecting shafts 43 are arranged below the two first upper connecting shafts 42 in a staggered manner, so that the upper folding rod 22 and the lower folding rod 23 can rotate from a horizontal state to a vertical state at the same time and do not interfere with each other, thereby guaranteeing the folding function of the folding cart, and increasing the practicability. In this embodiment, when the underframe is in an unfolded state, the upper folding rod 22 is limited to the lower side of the first rotating body 41, and meanwhile, the lower folding rod 23 is limited on the upper side of the second rotating body 42, so that the underframe 2 can be stably maintained in the unfolded state. In some other embodiments, when the underframe is in the unfolded state, the underframe 2 can also be maintained in the unfolded state only by limiting the upper folding rod 22 to the lower side of the first rotating body 41, or only by limiting the lower folding rod 23 to the upper side of the second rotating body 42.

Figure 1:
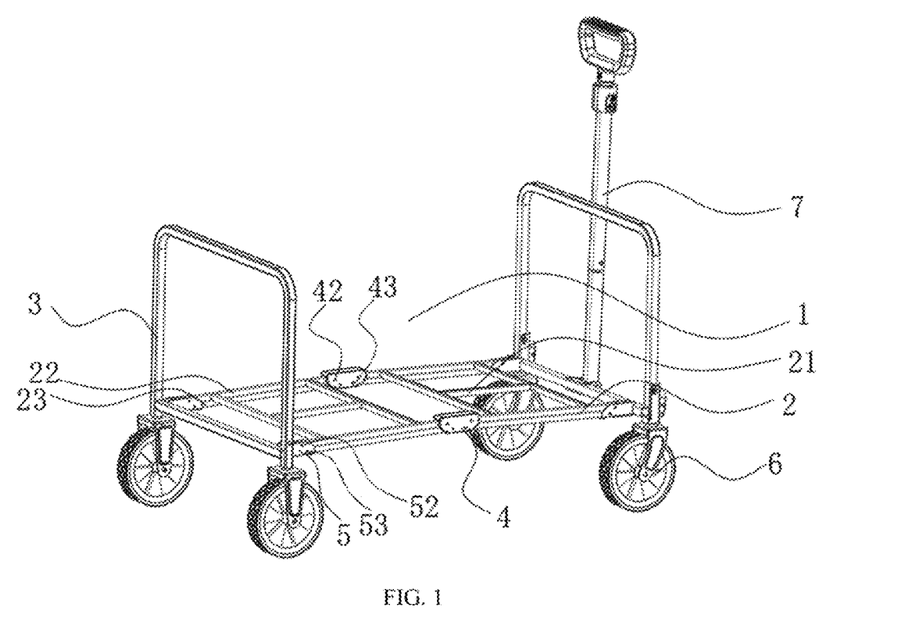
FIG. 1 is a schematic structural diagram of a simple folding cart according to an embodiment of the present invention.
Figure 2:
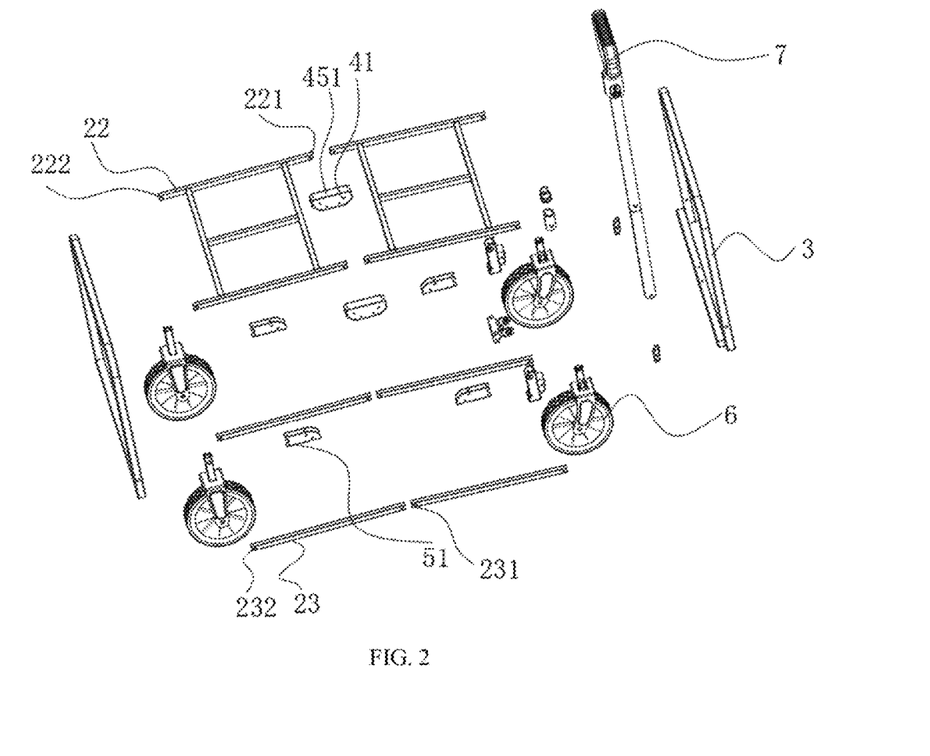
FIG. 2 is an exploded view 1 of a simple folding cart according to an embodiment of the present invention.
Figure 3:
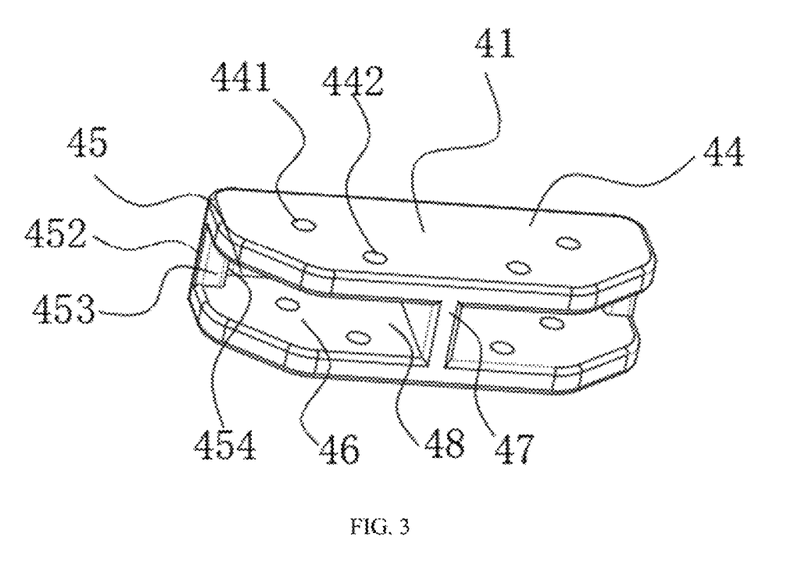
FIG. 3 is a schematic structural diagram of a first rotating body according to an embodiment of the present invention.

As shown in FIG. 1 to FIG. 3, the first rotating body 41 includes two first rotating side plates 44 arranged opposite to each other and a first connecting plate 45 connected between the two first rotating side plates 44, a first rotating groove 46 is formed between a lower side of the first connecting plate 45 and the two first rotating side plates 44 in a surrounding manner, one end of the upper folding rod 22 is arranged in the first rotating groove 46 and is hinged to the first rotating side plate 44 through the first upper connecting shaft 42, one end of the lower folding rod 23 is arranged in the first rotating groove 46 and is hinged to the first rotating side plate 44 through the first lower connecting shaft 43, and when the underframe 2 is in the unfolded state, the first connecting plate 45 abuts against the upper side surface of the upper folding rod 22, and the upper folding rod 22 can be positioned by abutting the first connecting plate 45 against the upper folding rod 22 when the underframe 2 is subjected to a force, so that the folding rod is maintained in a horizontal position, the loading carrying capacity of the cart is improved, and the stability and practicality of the whole cart are improved.

As shown in FIG. 1 to FIG. 3, the first connecting plate 45 includes a first plate body 451 arranged in a horizontal direction and a first limiting portion 452 extending downwards from the first plate body 451, the first limiting portion 452 is provided with a first limiting bottom surface 453 and a first limiting side surface 454 facing the first rotating groove 46, when the underframe 2 is in an unfolded state, the upper folding rod 22 abuts against the first limiting bottom surface 453, and the upper folding rod 22 is limited to maintain a horizontal state, and when the underframe 2 is in a folded state, the upper folding rod 22 can abut against the first limiting side surface 454, and the upper folding rod 22 is limited to maintain a vertical state.

As shown in FIG. 1 to FIG. 3, the first rotating body 41 further includes a partition plate 47 connected between the two first rotating side plates 44, the first connecting plate 45 is disposed along the top of the two first rotating side plates 44, the partition plate 47 is arranged on the lower side of the first connecting plate 45 in a vertical direction, the two sides of the partition plate 47 are respectively provided with the first rotating grooves 46 arranged corresponding to the upper folding rod 22 and the lower folding rod 23 of the two folding frames 21, the first rotating body 41 is provided with first rotating openings 48 extending from two sides of the partition plate 47 to the lower side of the first connecting plate 45 respectively, each first rotating opening 48 is in communication with each first rotating groove 46 and is used for allowing an end portion of the upper folding rod 22 and an end portion the lower folding rod 23 to rotate inside. The positions and the rotation directions of the upper folding rod and the lower folding rod 23 are limited so as to provide enough rotating space. In addition, the partition plate 47 is disposed, so that the stability of the overall structure of the first rotating body 41 is improved, which is more robust and durable, and in other embodiments, the partition plate 47 may not be disposed.

As shown in FIG. 1 to FIG. 3, a first upper connecting channel 221 for rotatably mounting the first upper connecting shaft 42 is disposed on the upper folding rod 22 in a penetrating manner, first upper connecting holes 441 for rotatably mounting the first upper connecting shaft 42 are respectively disposed on the two first rotating side plates 44 in a penetrating manner, and the upper folding rod 22 is rotatably connected to the first rotating body 41 in a matching manner in the first upper connecting channel 221 and the first upper connecting hole 441 through the first upper connecting shaft 42. A first lower connecting channel 231 for rotatably mounting the first lower connecting shaft 43 is disposed on the lower folding rod 23 in a penetrating manner, first lower connecting holes 442 for rotatably mounting the first lower connecting shaft 43 are respectively disposed on the two first rotating side plates 44 in a penetrating manner, and the lower folding rod 23 is rotatably connected to the first rotating body 41 in a matching manner in the first lower connecting channel 231 and the first lower connecting hole 442 through the first lower connecting shaft 43. Through positioning of the first upper and lower connecting holes, the position relation between the first upper and lower connecting shafts and the first upper and lower connecting holes is ensured to achieve the position that can be carried and rotated.

As shown in FIG. 1 to FIG. 3, the two first upper connecting shafts 42 and the two first lower connecting shafts 43 of the first rotating structure 4 are arranged in an isosceles trapezoid structure, the two first upper connecting shafts 42 are arranged along two ends of an upper bottom of the isosceles trapezoid structure, the two first lower connecting shafts 43 are arranged along two ends of a lower bottom of the isosceles trapezoid structure, and a distance between the two first lower connecting shafts 43 is smaller than a distance between the two first upper connecting shafts 42. The position design of the isosceles trapezoid with the wide upper portion and the narrow lower portion provides sufficient rotation distance for the upper folding rod and the lower folding rod 23, so that the end portion of the folding rod does not abut against the first limiting portion 452 due to insufficient distance.

As shown in FIG. 1, the lower folding rod 23 is stacked on the lower side of the upper folding rod 22, and an upper side surface of the lower folding rod 23 is in contact with a lower side surface of the upper folding rod 22, so that the lower folding rod and the upper folding cart can be matched with the isosceles trapezoid positions of the first upper connecting shaft and the lower connecting shaft during loading, the mutual abutting effect is achieved, deformation of the upper folding rod and deformation of the lower folding rod 23 are reduced, the loading capacity of the underframe 2 is improved, and the practicability of the cart is improved.

Figure 4:
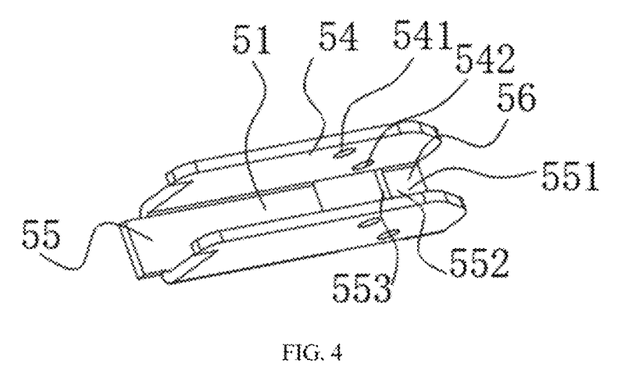
FIG. 4 is a schematic structural diagram of a second rotating body according to an embodiment of the present invention.

As shown in FIG. 1 and FIG. 4, the second rotating body 51 includes two second rotating side plates 54 arranged opposite to each other and a second connecting plate 55 connected between the two second rotating side plates 54, a second rotating groove 56 is formed between an upper side of the second connecting plate 55 and the two second rotating side plates 54 in a surrounding manner, the other end of the upper folding rod 22 is arranged in the second rotating groove 56 and is hinged to the second rotating side plate 54 through the second upper connecting shaft 52, the other end of the lower folding rod 23 is arranged in the second rotating groove 56 and is hinged to the second rotating side plate 54 through the second lower connecting shaft 53, and when the underframe 2 is in an unfolded state, the second connecting plate 55 abuts against a lower side surface of the lower folding rod 23. The abutting of the second connecting plate 55 can provide enough support for the lower folding rod 23 when the cart is loaded, and is combined with the abutting of the first limiting bottom surface 453 against the upper folding rod 22 and the abutting of the upper folding rod and lower folding rod 23 against each other, so that the loading capacity of the underframe 2 of the cart is enhanced, and the stability and practicability of the cart are improved.

As shown in FIG. 4, the second connecting plate 55 is arranged in a horizontal direction, the second connecting plate 55 is provided with an opening structure for allowing the end portion of the lower folding rod 23 to rotate inside, a second limiting portion 551 is formed on the second connecting plate 55 on one side of the opening structure away from the side frame 3, the second limiting portion 551 is provided with a second limiting top surface 552 and a second limiting side surface 553 facing the opening structure, when the underframe 2 is in an unfolded state, the lower folding rod 23 abuts against the second limiting top surface 552, so that the lower folding rod 23 can be maintained in a horizontal state, and when the underframe 2 is in a folded state, the lower folding rod 23 can abut against the second limiting side surface 553, so that the lower folding rod 23 can be maintained in a vertical state. A second upper connecting channel 222 for rotatably mounting the second upper connecting shaft 52 is disposed on the upper folding rod 22 in a penetrating manner, second upper connecting holes 541 for rotatably mounting the second upper connecting shaft 52 are respectively disposed on the two second rotating side plates 54 in a penetrating manner, and the upper folding rod 22 is rotatably connected to the second rotating body 51 in a matching manner in the second upper connecting channel 222 and the second upper connecting hole 541 through the second upper connecting shaft 52, and a second lower connecting channel 232 for rotatably mounting the second lower connecting shaft 53 is disposed on the lower folding rod 23 in a penetrating manner, second lower connecting holes 542 for rotatably mounting the second lower connecting shaft 53 are respectively disposed on the two second rotating side plates 54 in a penetrating manner, and the lower folding rod 23 is rotatably connected to the second rotating body 51 in a matching manner in the second lower connecting channel 232 and the second lower connecting hole 542 through the second lower connecting shaft 53. Through positioning of the connecting holes, the hole positions at the two second rotating mechanisms on the front and rear can also be of an isosceles trapezoid structure with a wide upper portion and a narrow lower portion. The second upper and lower connecting shafts on the two sides and the corresponding side frames 3 form a triangular supporting structure, so that the side frames 3 can be stabilized in an unfolding mode after being unfolded, and the structural strength of the cart is improved.

Figure 5:
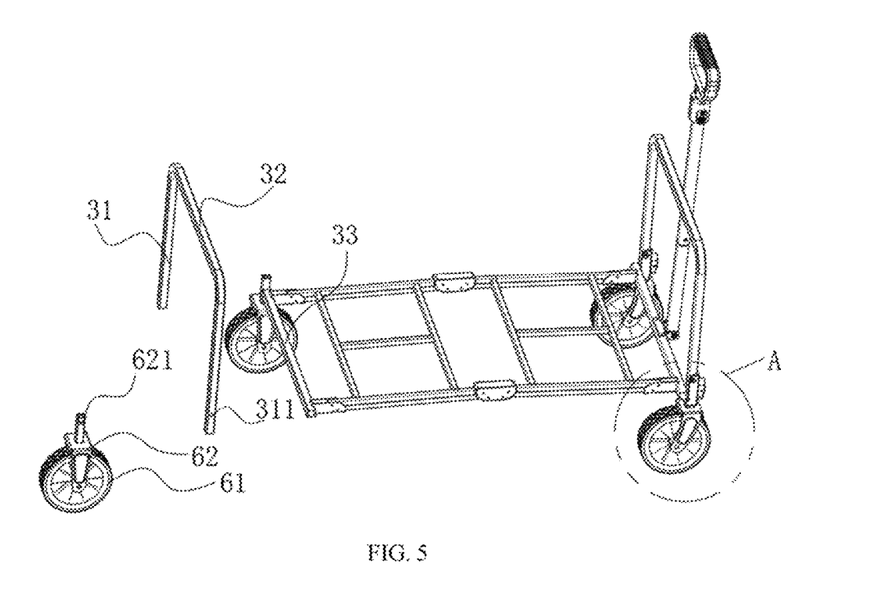
FIG. 5 is an exploded view 2 of a simple folding cart according to an embodiment of the present invention.
Figure 6:
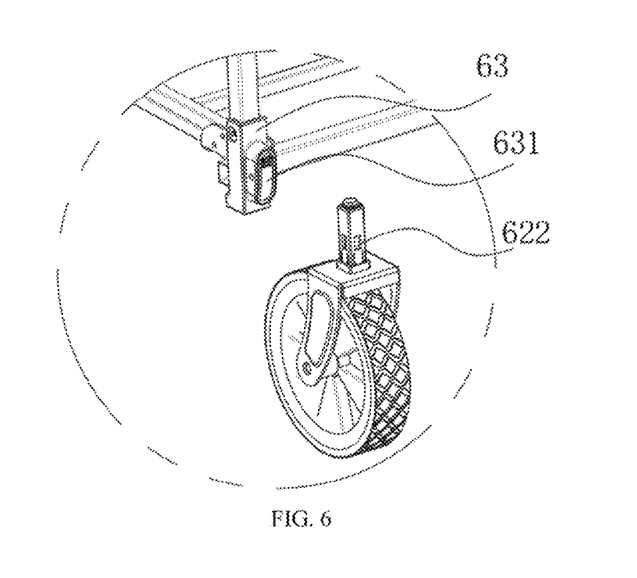
FIG. 6 is an exploded view of a position A in FIG. 5.
Figure 7:
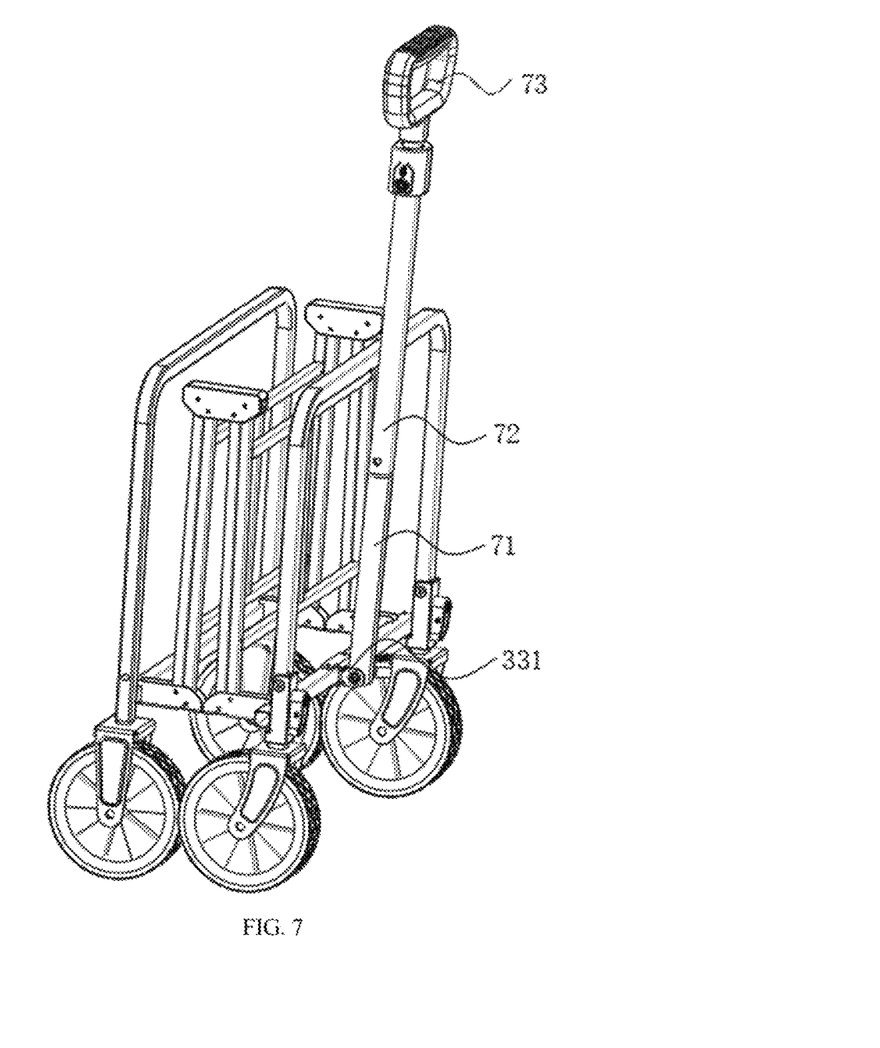
FIG. 7 is a folded state diagram of a simple folding cart according to an embodiment of the present invention.

As shown in FIG. 5 and FIG. 7, the side frame 3 includes two vertical rods 31 arranged opposite to each other, a first horizontal rod 32 connected between upper portions of the two vertical rods 31, and a second horizontal rod 33 connected between lower portions of the two vertical rods 31. In this embodiment, the second rotating body 51 is fixedly disposed on the second horizontal rod 33. In another embodiment, the second rotating body 51 can also be fixedly disposed on a lower portion of the vertical rod 31, or is fixedly disposed at other positions on the lower portion of the side frame 3. In the unfolded state, an open structure without a connecting frame is arranged between the two side portions of the two side frames 3, and an object with the length exceeding the length of the cart can be placed in the width direction. The cart further includes at least four wheel body assemblies 6, each wheel body assembly 6 includes a rolling wheel member 61 and a rolling wheel support 62 used for mounting the rolling wheel member 61, and the rolling wheel support 62 of each wheel body assembly 6 is detachably connected to a lower end of each vertical rod 31 through a quick release structure 63. The rolling wheel support 62 at one end of the cart is integrally formed with the quick release structure 63, and a telescopic elastic sheet 621 in the rolling wheel support 62 is pressed to extend into the positioning hole 311 arranged on the vertical rod 31. The quick release structure 63 is disposed on the vertical rod 31 at the other end of the cart in a covering manner. By pressing one end of a touch warping plate 631 of the quick release structure 63, one end of the touch warping plate 631 with a locking block (not shown in the figure) is disengaged from a locking groove 622 of the rolling wheel support 62, so that the rolling wheel support 62 falls off to complete disassembly. The cart further includes at least one pull rod structure 7 rotatably connected to the second horizontal rod 33, and the pull rod structure 7 includes a lower pull rod 71, an upper pull rod 72 telescopically connected to the lower pull rod 71, and a pull rod handle 73 connected to an upper end of the upper pull rod 72. A pull rod base 331 connected to the pull rod structure 7 is disposed on the second horizontal rod 33, and the lower pull rod 71 is hinged to the pull rod base 331. The pull rod structure 7 is unfolded and positioned by using a pull rod elastic sheet (not shown in the figure) between the upper pull rod and the lower pull rod, thereby reducing the overall size of the cart after being folded and reducing the space occupation.

Finally, it should be noted that the above embodiments are only used to illustrate the technical solutions of the present invention rather than limiting thereto. Although the present invention has been described in detail with reference to the foregoing embodiments, a person of ordinary skill in the art should understand that the technical solutions recited in the foregoing embodiments may still be modified, or some of the technical features thereof may be replaced with equivalents. These modifications or replacements do not make the essence of the corresponding technical solution deviate from the scope of the technical solutions in the embodiments of the present invention.

In summary, the foregoing descriptions are only preferred embodiments of the present invention, and all equivalent changes and modifications made in accordance with the patent claims of the present invention shall fall within the scope of the present invention patent.

What is claimed is:

1. A simple folding cart, comprising a cart frame body and a cloth cover sleeved on the cart frame body, wherein the cart frame body comprises an underframe and two side frames respectively arranged on two sides of the underframe in a length direction, the underframe comprises two folding frames, one ends of the two folding frames are mutually hinged through a first rotating structure, and the other ends of the two folding frames are respectively hinged to the side frames correspondingly arranged through a second rotating structure:

each side of each folding frame comprises an upper folding rod arranged in a length direction of the underframe and a lower folding rod arranged on a lower side of the upper folding rod: the first rotating structure comprises two first rotating bodies, one on each side of the cart, two first upper connecting shafts arranged at intervals and two first lower connecting shafts arranged at intervals, and two first lower connecting shafts are arranged below the two first upper connecting shafts in a staggered manner; and the second rotating structure comprises four second rotating bodies, one at each corner of the cart, a second upper connecting shaft, and a second lower connecting shaft arranged below one side, close to the first rotating structure, of the second upper connecting shaft in a staggered manner; and one end of the upper folding rod is hinged to the first rotating body through the first upper connecting shaft, and the other end of the upper folding rod is hinged to the second rotating body through the second upper connecting shaft; and one end of the lower folding rod is hinged to the first rotating body through the first lower connecting shaft, and the other end of the lower folding rod is hinged to the second rotating body through the second lower connecting shaft, and the underframe can be limited on a lower side of the first rotating body through the upper folding rod and/or can be limited on an upper side of the second rotating body through the lower folding rod so as to be maintained in an unfolded state and support the two side frames to be maintained in an unfolded state, wherein the first rotating body comprises two first rotating side plates arranged opposite to each other and a first connecting plate connected between the two first rotating side plates, a first rotating groove is formed between a lower side of the first connecting plate and the two first rotating side plates in a surrounding manner, one end of the upper folding rod is arranged in the first rotating groove and is hinged to the first rotating side plate through the first upper connecting shaft, one end of the lower folding rod is arranged in the first rotating groove and is hinged to the first rotating side plate through the first lower connecting shaft, and when the underframe is in an unfolded state, the first connecting plate abuts against an upper side surface of the upper folding rod, the first connecting plate comprises a first plate body arranged in a horizontal direction and a first limiting portion extending downwards from the first plate body, the first limiting portion is provided with a first limiting bottom surface and a first limiting side surface facing the first rotating groove, when the underframe is in an unfolded state, the upper folding rod abuts against the first limiting bottom surface, and when the underframe is in a folded state, the upper folding rod can abut against the first limiting side surface, the first rotating body further comprises a partition plate connected between the two first rotating side plates, the first connecting plate is disposed along the top of the two first rotating side plates, the partition plate is arranged on the lower side of the first connecting plate in a vertical direction, the two sides of the partition plate are respectively provided with the first rotating grooves arranged corresponding to the upper folding rod and the lower folding rod of the two folding frames, the first rotating body is provided with first rotating openings extending from two sides of the partition plate to the lower side of the first connecting plate respectively, each first rotating opening is in communication with each first rotating groove and is used for allowing an end portion of the upper folding rod and an end portion the lower folding rod to rotate inside.

2. The simple folding cart according to claim 1, wherein a first upper connecting channel for rotatably mounting the first upper connecting shaft is disposed on the upper folding rod in a penetrating manner, first upper connecting holes for rotatably mounting the first upper connecting shaft are respectively disposed on the two first rotating side plates in a penetrating manner, and the upper folding rod is rotatably connected to the first rotating body in a matching manner in the first upper connecting channel and the first upper connecting hole through the first upper connecting shaft; and a first lower connecting channel for rotatably mounting the first lower connecting shaft is disposed on the lower folding rod in a penetrating manner, first lower connecting holes for rotatably mounting the first lower connecting shaft are respectively disposed on the two first rotating side plates in a penetrating manner, and the lower folding rod is rotatably connected to the first rotating body in a matching manner in the first lower connecting channel and the first lower connecting hole through the first lower connecting shaft.

3. A simple folding cart, comprising a cart frame body and a cloth cover sleeved on the cart frame body, wherein the cart frame body comprises an underframe and two side frames respectively arranged on two sides of the underframe in a length direction, the underframe comprises two folding frames, one ends of the two folding frames are mutually hinged through a first rotating structure, and the other ends of the two folding frames are respectively hinged to the side frames correspondingly arranged through a second rotating structure;

each side of each folding frame comprises an upper folding rod arranged in a length direction of the underframe and a lower folding rod arranged on a lower side of the upper folding rod; the first rotating structure comprises two first rotating bodies, one on each side of the cart, two first upper connecting shafts arranged at intervals and two first lower connecting shafts arranged at intervals, and two first lower connecting shafts are arranged below the two first upper connecting shafts in a staggered manner; and the second rotating structure comprises four second rotating bodies, one at each corner of the cart, a second upper connecting shaft, and a second lower connecting shaft arranged below one side, close to the first rotating structure, of the second upper connecting shaft in a staggered manner; and one end of the upper folding rod is hinged to the first rotating body through the first upper connecting shaft, and the other end of the upper folding rod is hinged to the second rotating body through the second upper connecting shaft; and one end of the lower folding rod is hinged to the first rotating body through the first lower connecting shaft, and the other end of the lower folding rod is hinged to the second rotating body through the second lower connecting shaft, and the underframe can be limited on a lower side of the first rotating body through the upper folding rod and/or can be limited on an upper side of the second rotating body through the lower folding rod so as to be maintained in an unfolded state and support the two side frames to be maintained in an unfolded state, the two first upper connecting shafts and the two first lower connecting shafts of the first rotating structure are arranged in an isosceles trapezoid structure, the two first upper connecting shafts are arranged along two ends of an upper side of the isosceles trapezoid structure, the two first lower connecting shafts are arranged along two ends of a lower bottom of the isosceles trapezoid structure, and a distance between the two first lower connecting shafts is smaller than a distance between the two first upper connecting shafts, wherein the lower folding rod is stacked on the lower side of the upper folding rod, and an upper side surface of the lower folding rod is in contact with a lower side surface of the upper folding rod.

4. The simple folding cart according to claim 1, wherein the side frame comprises two vertical rods arranged opposite to each other, a first horizontal rod connected between upper portions of the two vertical rods, and a second horizontal rod connected between lower portions of the two vertical rods, and each second rotating body is fixedly disposed at the lower portion of a respective vertical rod;

an open structure without a connecting frame is arranged between two side portions of the two side frames:

the cart further comprises at least four wheel body assemblies, each wheel body assembly comprises a rolling wheel member and a rolling wheel support used for mounting the rolling wheel member, and the rolling wheel support of each wheel body assembly is detachably connected to a lower end of each vertical rod through a quick release structure; and the cart further comprises at least one pull rod structure rotatably connected to the second horizontal rod, and the pull rod structure comprises a lower pull rod, an upper pull rod telescopically connected to the lower pull rod, and a pull rod handle connected to an upper end of the upper pull rod.

5. A simple folding cart, comprising a cart frame body and a cloth cover sleeved on the cart frame body, wherein the cart frame body comprises an underframe and two side frames respectively arranged on two sides of the underframe in a length direction, the underframe comprises two folding frames, one ends of the two folding frames are mutually hinged through a first rotating structure, and the other ends of the two folding frames are respectively hinged to the side frames correspondingly arranged through a second rotating structure;

each side of each folding frame comprises an upper folding rod arranged in a length direction of the underframe and a lower folding rod arranged on a lower side of the upper folding rod: the first rotating structure comprises two first rotating bodies, one on each side of the cart, two first upper connecting shafts arranged at intervals and two first lower connecting shafts arranged at intervals, and two first lower connecting shafts are arranged below the two first upper connecting shafts in a staggered manner; and the second rotating structure comprises four second rotating bodies, one at each corner of the cart, a second upper connecting shaft, and a second lower connecting shaft arranged below one side, close to the first rotating structure, of the second upper connecting shaft in a staggered manner; and one end of the upper folding rod is hinged to the first rotating body through the first upper connecting shaft, and the other end of the upper folding rod is hinged to the second rotating body through the second upper connecting shaft; and one end of the lower folding rod is hinged to the first rotating body through the first lower connecting shaft, and the other end of the lower folding rod is hinged to the second rotating body through the second lower connecting shaft, and the underframe can be limited on a lower side of the first rotating body through the upper folding rod and/or can be limited on an upper side of the second rotating body through the lower folding rod so as to be maintained in an unfolded state and support the two side frames to be maintained in an unfolded state, wherein the second rotating body comprises two second rotating side plates arranged opposite to each other and a second connecting plate connected between the two second rotating side plates, a second rotating groove is formed between an upper side of the second connecting plate and the two second rotating side plates in a surrounding manner, the other end of the upper folding rod is arranged in the second rotating groove and is hinged to the second rotating side plate through the second upper connecting shaft, the other end of the lower folding rod is arranged in the second rotating groove and is hinged to the second rotating side plate through the second lower connecting shaft, and when the underframe is in an unfolded state, the second connecting plate abuts against a lower side surface of the lower folding rod.

6. The simple folding cart according to claim 5, wherein the second connecting plate is arranged in a horizontal direction, the second connecting plate is provided with an opening structure for allowing the end portion of the lower folding rod to rotate inside, a second limiting portion is formed on the second connecting plate on one side of the opening structure away from the side frame, the second limiting portion is provided with a second limiting top surface and a second limiting side surface facing the opening structure, when the underframe is in an unfolded state, the lower folding rod abuts against the second limiting top surface, and when the underframe is in a folded state, the lower folding rod can abut against the second limiting side surface.

* * * * *